Figures 1, 2:
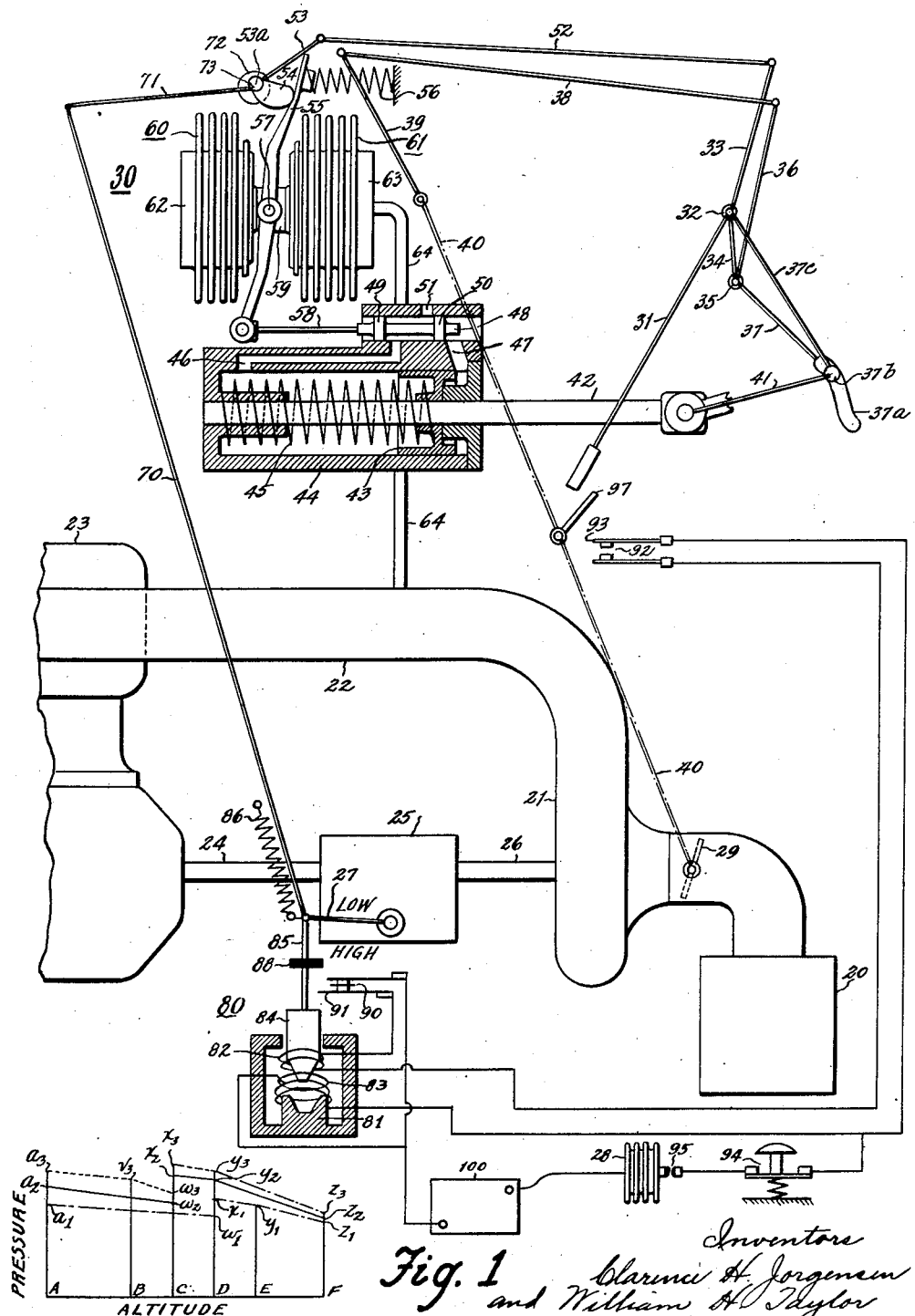

June 12, 1951 C. H. JORGENSEN ET AL 2,556,192
POWER PLANT
Filed March 22, 1943

Inventors
Clarence H. Jorgensen
and William H. Taylor
by Spencer Hardman & Fehr
their attorneys Patented June 12, 1951

2,556,192

UNITED STATES PATENT OFFICE 2,556,192

POWER PLANT

Clarence H. Jorgensen and William H. Taylor, Anderson, Ind., assignors to General Motors Corporation, Detroit, Mich., a corporation of Delaware Application March 22, 1943, Serial No. 480,036

30 Claims. (Cl. 123—103)

This invention relates to the control of an airplane engine which drives its supercharger through change-speed gearing. It is an object of the invention so to control the engine and supercharger that an ascent can be made to high altitude in the minimum time while protecting the engine against such over-boosting of the fuel intake pressure as would quickly cause destruction of the engine. During ascent in the lower altitude range the supercharger is driven by the engine at a certain low relative speed, thus restricting the power output to the supercharger to a low value and making more power output available to the propeller. During ascent in the high altitude range, the supercharger is driven by the engine at a certain high relative speed in order to maintain such fuel intake pressure as will enable the engine to develop its maximum rated power until a critical altitude is reached which is substantially higher than the critical altitude for the pressure originally selected for the ascent with low-speed supercharger operation. The change from low-speed supercharger operation to high-speed supercharger operation is accompanied by a boost in pressure commensurate with the increase in horse-power required to operate the supercharger at higher speed. Thus, the power available to the propeller will be the same after the change in supercharger speed as existed before this change. Precaution must be taken that the boost in fuel intake pressure does not raise the pressure to such value that the engine is over-boosted and the pressure of combustion destroys the engine. Therefore the change from low-speed to high-speed operation of the supercharger must come at an altitude which is higher than the altitude which is critical for the maximum pressure selected for the take-off with low-speed supercharger operation in order to allow the pressure to diminish before speed-increase to such lower value that, when the pressure is boosted concurrently with the speed-increase, the horse power output to the propeller after the shift will be substantially the same as the horsepower just before the shift. The altitude which is safe for shift to high gear when the pressure preselected for ascent is maximum obviously will be safe for lower pressure selections.

To accomplish this object, the engine throttle valve and the supercharger change-speed gearing are under a coordinated control provided by an engine intake fuel pressure regulator having manually operable means for selecting various pressures to be maintained and having means responsive to the shifting of the change-speed gearing into high for boosting the selected pressure and provided by altitude responsive means which will not effect the shift into high gear until at least that altitude is attained which is safe for shift when maximum take-off pressure had been pre-selected. In case the pre-selected pressure to be maintained by the supercharger is of such low value that the critical altitude for that pressure selected with low-speed supercharger operation exceeds the safe-for-shift altitude, there is no need to shift at the safe-for-shift altitude as the engine does not begin to lose power until the higher, critical altitude is reached. Therefore the shift must be deferred until the higher, critical altitude is reached. Consequently, the gear-shift mechanism is under the joint control of an aneroid which performs a function at the safe-for-shift altitude and the engine pressure regulator which performs a function when the throttle has been moved to wide-open position. Both of these controlling functions must have been performed before shifting into high gear is effected. This coordinated control must also provide that when the supercharger gearing has been shifted into high, it shall remain in high gear as long as the altitude is at least as great as the safe-for-shift altitude.

In the disclosed embodiment of the present invention, a solenoid is provided with an armature attracting coil and with an armature holding coil. These coils act cumulatively to cause the solenoid armature to shift the supercharger gearing into high gear when the engine throttle valve is wide open and when at least the safe-for-shift altitude has been reached. In response to the shifting into high gear, the armature attracting coil becomes deenergized, while the armature holding coil remains as long as the altitude is at least substantially as high as the safe-for-shift altitude. Therefore the gearing remains in high at or above safe-for-shift altitude although the throttle valve may partly close after the shift into high takes place.

Further objects and advantages of the present invention will be apparent from the following description, reference being had to the accompanying drawings wherein a preferred embodiment of the present invention is clearly shown.

In the drawings:

Fig. 1 of the drawings is a diagram of an embodiment of the present invention.

Fig. 2 is a chart showing the relation of altitudes and intake pressure.

According to Fig. 1, a carburetor 20 supplies combustible mixture to inlet of a supercharger 21 whose outlet is connected by pipe 22 with the intake ports of an engine 23. Engine 23 drives a shaft 24 connected by change speed gearing 25 with a shaft 26 which drives the supercharger 21. Gearing 25 is in low speed condition when change speed lever 27 is in the low position shown. If lever 27 is moved counterclockwise to high position, the gearing 25 is in high speed condition and supercharger runs at a rate relative to engine speed which is higher than when lever 27 is in low speed position.

The lever 27 is under the joint control of an aneroid 28 and a throttle valve regulator 30 which determines the extent of opening of a throttle valve 29 in the duct between carburetor 20 and supercharger 21.

The regulator 30 has a main control lever 31 which is manually operated from the pilot's seat. Lever 31 is pivoted at 32 and operates arms 33 and 34. Arm 34 carries the fulcrum 35 for bellcrank lever arms 36 and 37. Arm 36 is connected by link 38 with arm 39 attached to shaft 40 attached to throttle valve 29. Arm 37 has a cam slot 37a which receives a cam follower roller 37b carried by a link 41 connected with the piston rod 42 of an hydraulic servo-motor having a piston 43 slidable in a cylinder 44 and urged toward the right by a spring 45. Roller 37b is connected also with an arm 37c pivotally supported at 32. Cylinder 44 has ports 46 and 47 controlled by a valve 48 having lands 49 and 50 capable of covering both ports 46 and 47 simultaneously, or of placing pressure fluid inlet 51 in communication with either one of these ports.

Arm 33 is connected by link 52 with an arm 53 connected with shaft 53a for rotating a pressure selecting cam 54 against which a lever 55 is urged by a spring 56. Lever 55 is fulcrumed at 57 and is connected by rod 58 with valve 48. Fulcrum 57 is supported by bridge 59 connecting the free ends of metal bellows 60 and 61 having their ends 62 and 63, respectively, fixed. Bellows 60 is sealed and evacuated. Bellows 61 is connected by pipe 64 with the fuel duct 22. The bellows 60 and 61 contain springs not shown which are so calibrated that fulcrum 57 moves in a predetermined relation to changes in engine intake pressure.

The normal position of the piston rod 42 is shown. Movement of lever 31 counterclockwise from the idle position shown causes an opening movement of throttle 29 and a counterclockwise movement of cam 54 thereby causing lever 55 to locate valve 48 so that pressure fluid inlet 51 communicates with cylinder port 46. Then rod 42 moves left to effect whatever further opening movement of throttle valve 29 is required to maintain the fuel intake pressure selected by cam 54 when moved from its normal position by movement of lever 31 counterclockwise. When the selected pressure is attained, bellows 61 will have expanded to an extent such that fulcrum 57 moves to cause valve 48 to be placed in position for closing both ports 46 and 47 of cylinder 44. As the altitude increases, rod 42 will move further and further toward the left to cause the selected pressure to be maintained. Critical altitude for a selected pressure is attained when the piston 43 has moved to the limit of travel toward the left, so that opening movement of the throttle valve 29 ceases. The lengths and locations of the levers and the shape of the cam slot 37b of the regulator are such that the throttle valve 29 can be moved by the piston 43 to wide open position for pressure selections over a relatively wide range, as from minimum cruise to emergency. This feature is disclosed in detail in the copending application of Jorgensen and Taylor, S. N. 483,438, filed April 17, 1943, and now abandoned.

The pressure selected by the location of cam 54 is gradually reduced as altitude increases due to the fact that the area of bellows 60 subjected to atmospheric pressure is less than the area of bellows 61. The difference in area is such that, at critical altitude for low relative speed operation of the supercharger, the selected pressure has dropped a few percent from the selected ground level pressure. This drop in pressure is allowed because the engine exhaust back pressure decreases as altitude increases.

When a certain altitude is reached which is critical for a certain selected pressure with low-speed blower operation, the rod 42 will have moved to its extreme left position and the throttle valve 29 will be wide open. That altitude is called critical because, if exceeded, the fuel intake pressure decreases rapidly and the engine loses power. The higher the pressure selection, the lower will be the critical altitude and viceversa. Therefore means responsive to a predetermined altitude and to a function of regulator 30 are provided for increasing the speed of supercharger 21 so that higher altitudes can be reached without loss of power.

The means for increasing the speed of the supercharger 21 comprises a solenoid 80 having a magnetizable core 81 excited by an armature attracting coil 82 and an armature holding coil 83. Armature 84 is connected by rod 85 with lever 27. A spring 86 opposes movement of lever 27 from low gear to high gear position and causes lever 27 to move back to low gear position when the solenoid is deenergized. Coil 82 is connected with a battery 100 through a normally closed switch 90 having a flexible blade 91, a normally open switch 92 having a flexible blade 93, a normally closed, manually opened switch 94, and a normal open switch 95 closed by aneroid 28 when a predetermined altitude is reached.

When a predetermined altitude is reached which is safe-for-shift altitude for all pressure selections for which the regulator 30 is set, with the supercharger gearing operating at low speed, the aneroid 28 will have expanded and closed the switch 95. When the throttle valve 29 has been moved to wide open position, a lever 97 attached to throttle valve shaft 40 will have engaged blade 93 and closed switch 92. Then the solenoid windings 82 and 83 are both connected with battery 100 and cause armature 84 to move down and lever 27 to move to high gear position. As armature 84 moves down, an insulating plate 98 attached to rod 85 engages blade 91 and opens the switch 90. Coil 82 is deenergized; but coil 83, the armature holding coil, remains connected with the battery 100 through the aneroid switch 95. Therefore, although the regulator 30 may operate to move the throttle valve 29 toward closed position, the gearing 25 remains in high speed condition until the altitude decreases slightly below the safe-for-shift altitude. When switch 95 opens, the armature 84 is released and spring 86 returns the lever 27 to low gear position.

The lever 27 is connected by a link 70 with a lever 71 which rotates a shaft 72 having its axis 73 below the axis of selector cam shaft 53a which is supported by shaft 72. When shaft 27 is rotated counterclockwise to shift the change speed gearing 25 into high gear condition, shaft 72 is rotated counterclockwise to cause cam 54 to move toward the left to allow spring 56 to move lever 55 counterclockwise. This so modifies the operation of the regulator as to cause it to maintain an intake pressure which is greater than the pressure which existed before the gearing 25 was shifted into high. Increase of intake pressure causes the engine to develop additional power required to operate the supercharger at higher relative speed, while the power available to the propeller is as great as immediately before the shift took place.

The airplane can now climb to greater altitudes without loss of power until that altitude is reached which is critical for the selected pressure with the supercharger operating at high relative speed. The shift into high gear is made only when at least the safe-for-shift altitude has been reached and when the throttle has been moved by the regulator into wide-open position. Once the supercharger gearing has been shifted into high gear, it remains in high gear so long as at least the safe-for-shift altitude is maintained although the throttle may be partly closed, since the lever 27 is held by the solenoid holding coil 83 in high gear position. Only the opening of aneroid switch 95, when the altitude is slightly lower than said safe-for-shift altitude, will deenergize the solenoid so that gear position. By opening switch 94, return to low gear is effected This system of control provides for automatically maintaining an engine power output required for rapid ascent into high altitudes, but without burdening the engine with high speed operation of the supercharger until it is necessary to operate it at high speed to reach the desired high altitude without loss of power. Furthermore the engine is protected against overboosting by withholding the shift and the increase of pressure selection until at least a safe-for-shift altitude is attained.

Fig. 2 shows examples of pressure control starting at ground level, altitude A, with different selected pressures $a_1$, $a_2$ or $a_3$. The aneroid 28 is designed to close contacts 95 at safe-for-shift altitude C. Take first the case when C is also the altitude which is critical for a certain selected pressure $a_2$ with low speed supercharger operation. Pressure $a_2$ is, for example, suitable for normal cruise. The pressure $a_2$ droops gradually to $w_2$ at altitude C while horsepower output to the propeler remains practically constant. At altitudes higher than C the pressure would decrease rapidly because piston 43 already had moved left to the limit of travel and the throttle had fully opened. Therefore at altitude C, the supercharger gearing is shifted into high as the result of substantially concurrent closing of switch 95 and switch 92. At altitude C, the supercharger rotates faster and the pressure increases to $x_2$ which exceeds $a_2$ by an amount commensurate with the increased power required to operate the supercharger at increased speed, thus leave horsepower output to the propeller the same as before shift. Pressure $x_2$ falls gradually to $y_2$ at altitude D which is critical for that pressure. Then the pressure decreases more rapidly from $y_2$ to $z_2$ at altitude F.

Another example is when safe-for-shift altitude C is higher than the critical altitude for a selected pressure. The pressure selected at ground level A is pressure $a_3$, suitable for take off, which droops to $v_3$ at altitude B which is critical for that pressure. The servo-piston 43 has moved fully left to the limit and the switch 92 is closed; but there is no shift of the supercharger gearing because safe-for-shift altitude C has not been reached, switch 95 being still open. At altitude C, the pressure has fallen to $w_3$. Then the supercharger gearing is shifted into high upon the closing of switch 95. The pressure rises to $x_3$, which is in excess of $a_3$ but still safe for the engine, and droops to $y_3$ at altitude D which is critical for that pressure. Then the pressure falls more rapidly to $z_3$ at altitude F.

Another example is when safe-for-shift altitude C is lower than the critical altitude for a selected pressure. The pressure selected at ground level is $a_1$, below normal cruising pressure, which droops to $w_1$ at about altitude D which is critical for that pressure. When altitude C has been attained switch 95 closes, but no shift of the supercharger gearing took place because piston 43 had not moved fully left and switch 92 had not closed. At altitude D, the servo-motor piston 43 had moved fully left and switch 92 had closed. Then the gearing was shifted into high and the pressure rises to $x_1$ which exceeds $a_1$. The pressure droops from $x_1$ to $y_1$ at altitude E which is critical for that pressure. Then the pressure falls more rapidly to $z_1$ at altitude F.

Once the change speed gearing has been shifted into high the gearing will remain in high so long as the altitude is at least C, the safe-for-shift altitude. It follows that, if the pressure selections are such that the critical altitudes for low gear operation are C or less, the pressure changes during descent from F to A are substantially the same as ascent from A to F. The only difference is due to the fact that shift back into low gear takes place at an altitude slightly lower than C. But, if the pressure selections are such that critcal altitude for low gear operation are in excess of C, the pressure changes during descent from F to A are not all the same as during ascent from A to F. For example, if $a_1$ has been the pressure selected for operation at altitude A, in descending from F, the pressure would not fall from $x_1$ to $w_1$ at altitude D, because there would be no shifting back into low gear at altitude D. In descending from D to C the pressure would rise above $x_1$ for example to a pressure between $w_2$ and $w_3$, and then the shift would be made into low at an altitude slightly less than C, and the pressure would fall to the $a_1$—$w_1$ line.

While the embodiment of the present invention as herein disclosed constitutes a preferred form, it is to be understood that other forms might be adopted, all coming within the scope of the claims which follow.

What is claimed is as follows:

1. A power plant comprising an internal combustion engine having a fuel intake, a supercharger connected with the fuel intake, means for driving the supercharger by the engine including change speed gearing, a member for shifting the gearing and movable from a low-gear position to a high gear position, a servo-motor for moving the member, a throttle valve controlling the intake pressure produced by the supercharger, means for moving the throttle valve, and means responsive to altitude and to movement of the throttle valve for causing the servomotor to move the gear shift member from low gear to high gear position when the throttle valve has reached a predetermined open position and when at least a predetermined altitude has been reached, said last mentioned means including means operatively connected to said throttle valve compelling actuation of said last mentioned means upon movement of said throttle valve to said predetermined open position.

2. A power plant for aircraft comprising an internal combustion engine having a fuel intake, a supercharger connected with the fuel intake, means for driving the supercharger by the engine including change speed gearing, a member for shifting the gearing and movable from a low-gear position to a high gear position, a servo-motor for moving the member, a throttle valve controlling the intake pressure produced by the supercharger, an automatic throttle valve regulator for maintaining a pressure in relation to altitude means for controlling the operation of the servomotor to effect the shifting of said gearing to its high gear position, means responsive to altitude for actuating said last named means and means actuated by said regulator when the throttle has reached a predetermined position for also controlling said operation of the servomotor.

3. A power plant for aircraft comprising an internal combustion engine having a fuel intake, a supercharger connected with the fuel intake, means for driving the supercharger by the engine including change-speed gearing, a member for shifting the gearing and movable from a low-gear position to a high gear position, a servo-motor for moving the member, a throttle valve controlling the intake pressure produced by the supercharger, an automatic throttle valve regulator for maintaining a pressure in relation to altitude, an aneroid, means actuated by the aneroid when a predetermined altitude is reached for causing the servomotor to shift said gearing into high gear position and means actuated by said regulator when the throttle valve has been moved to a predetermined open position thereby to cause said servomotor to shift said gearing to its high gear position.

4. A power plant for aircraft comprising an internal combustion engine having a fuel intake, a supercharger connected with the fuel intake, means for driving the supercharger by the engine including change speed gearing, a member for shifting the gearing and movable from a low-gear position to a high gear position, a servo-motor for moving the member, a throttle valve controlling the intake pressure produced by the supercharger, an automatic throttle valve regulator for maintaining a pressure in relation to altitude and having adjustable means for selecting pressures to be maintained, means actuated by the aneroid when a predetermined altitude is reached for causing the servomotor to shift said gearing into high gear position and means actuated by said regulator when the throttle valve has been moved to a predetermined open position thereby to cause said servomotor to shift said gearing to its high gear position, and means responsive to movement of the change-speed member to high gear position for adjusting the pressure selecting means of the regulator.

5. A power plant for aircraft comprising an internal combustion engine having a fuel intake, a supercharger connected with the fuel intake, means for driving the supercharger by the engine including change speed gearing, a member for shifting the gearing and movable from a low-gear position to a high gear position, a throttle valve controlling the intake pressure produced by the supercharger, an automatic throttle valve regulator for maintaining a pressure in response to altitude and having adjustable means for selecting pressure to be maintained, and means for moving the change-speed member from low gear to high gear position, and means responsive to movement of the change-speed member to high gear position for adjusting the pressure selecting means of the regulator.

6. A power plant for aircraft comprising an internal combustion engine having a fuel intake, a supercharger connected with the fuel intake, means for driving the supercharger by the engine including change speed gearing, a member for shifting the gearing and movable from a low gear position to a high gear position, a throttle valve controlling the intake pressure produced by the supercharger, an automatic throttle valve regulator having a manually controlled pressure selecting means and having means for maintaining pressures within predetermined ranges from the manually selected pressure at ground level to lower pressures as altitude increases, means for moving the gear shift member from low gear to high gear position, and means responsive to movement of the gear shift member to high gear position for causing the regulator to maintain pressures within a range higher than the range manually selected.

7. A power plant for aircraft comprising an internal combustion engine having a fuel intake, a supercharger connected with the fuel intake, means for driving the supercharger by the engine including change speed gearing, a member for shifting the gearing and movable from a low gear position to a high gear position, a throttle valve controlling the intake pressure produced by the supercharger, an automatic throttle valve regulator having a manually controlled pressure selecting means and having means for maintaining pressures within predetermined ranges from the manually selected pressure at ground level to lower pressures as altitude increases, means responsive to altitude and under the control of the regulator for causing the gear-shift member to move from low gear to high gear position when at least a predetermined altitude is reached and when the throttle valve has been opened to a predetermined extent, and means responsive to movement of the gear-shift member to high gear position for causing the regulator to maintain pressures within a range higher than the range manually selected.

8. A power plant for aircraft comprising an internal combustion engine having a fuel intake, a supercharger connected with the fuel intake, means for driving the supercharger by the engine including a change speed gearing, a member for shifting the gearing and movable from a low gear position to a high gear position, a throttle valve controlling the intake pressure produced by the supercharger, a throttle valve regulator having manually operable means for effecting a throttle valve opening movement, a servo-motor for effecting additional opening movement of the throttle valve, a servo-motor control member, means controlled by the manual means for determining a position of control member to select a range of pressures to be maintained, means responsive to altitude and to intake pressure for effecting a movement of the control member to maintain intake pressure within a selected range, the values of pressure decreasing as altitude increases, said last named means comprising a bellows communicating with the engine intake and an aneroid bellows of lesser external area than the first bellows, means for moving the gear shift member from low gear to high gear position, and means responsive to movement of the gear shift member to high gear position for changing the position of the range selecting means of the regulator to cause the regulator to maintain pressures within a range higher than the range manually selected.

9. A power plant for aircraft comprising an internal combustion engine having a fuel intake, a supercharger connected with the fuel intake, means for driving the supercharger by the engine including change-speed gearing, a member for shifting the gearing and movable from a low-gear position to a high gear position, a solenoid for moving the gear shift member, a throttle valve controlling the intake pressure produced by the supercharger, a throttle valve regulator for maintaining a pressure in relation to altitude, and means responsive to the attainment of at least a certain altitude and to the opening of the throttle valve to a certain extent for rendering the solenoid operative to move the gear-shift member into high-gear position, and responsive thereafter only to the maintenance of at least said certain altitude for causing the solenoid to remain operative to keep the gear-shift member in high gear position regardless of throttle valve position.

10. A power plant for aircraft comprising an internal combustion engine having a fuel intake, a supercharger connected with the fuel intake, means for driving the supercharger by the engine including change-speed gearing, a member for shifting the gearing and movable from a low-gear position to a high gear position, a current source, a solenoid having a movable armature for moving the gear shift member and having an armature attracting coil and an armature holding coil, a throttle valve controlling the intake pressure produced by the supercharger, a throttle valve regulator for maintaining a pressure in relation to altitude, and means responsive to the attainment of at least a certain altitude and to the opening of the throttle valve to a certain extent for connecting both solenoid coils with the current source for rendering the solenoid operative to move the gear-shift member into high gear position, said means having provisions for disabling the attracting coil when the member is shifted into high gear position while the holding coil remains effective so long as at least a certain altitude is maintained.

11. A power plant comprising an internal combustion engine having a fuel intake, a supercharger connected with the fuel intake, means for driving the supercharger by the engine including change-speed gearing, a member for shifting the gearing and movable from a low-gear position to a high-gear position, a current source, a solenoid having a movable armature for moving the gear shift member and having an armature attracting coil and an armature holding coil, three switches in series for making a connection between the source and attracting coil, namely, a normally closed switch and two normally open switches, a throttle valve controlling the intake pressure produced by the supercharger, a throttle valve regulator for maintaining a pressure in relation to altitude, means responsive to the attainment of a certain altitude for closing one of the normally open switches, means responsive to the opening of throttle valve to a certain extent for closing the other of the normally open switches, means responsive to the movement of the gear shift member to high gear position for opening the normally closed switch to render the attracting coil inoperative, and a circuit including the normally open switch closed in response to the attainment of a certain altitude for maintaining the armature holding coil in operation so long as at least a certain altitude is maintained.

12. A power plant comprising an internal combustion engine having a fuel intake, a supercharger connected with the fuel intake, means for driving the supercharger by the engine including change speed gearing, a member for shifting the gearing and movable from a low-gear position to a high-gear position, an electromagnet for moving the member, a throttle valve controlling the intake pressure produced by the supercharger, means for moving the throttle valve, and means responsive to altitude and to movement of the throttle valve for causing said electromagnet to move the gear shift member from low-gear to high-gear position when the throttle valve has reached a predetermined open position and when at least a predetermined altitude has been reached.

13. Apparatus for controlling the induction pressure of an aircraft engine having, in combination, a throttle valve movable to different positions to variably regulate the induction pressure, means for moving said throttle valve, operating connections between said means and the throttle valve, a device for controlling the operation of said means including coaxial and expansible pressure responsive elements for controlling the operation of said means so that the throttle is moved upon changes in either atmospheric or induction pressure and means adjustable during operation of the engine for changing the adjustment of the operating connections between said means and the throttle, so that the movement of the throttle effected by any given movement of said means may be modified.

14. Apparatus for controlling the induction pressure of an aircraft engine having, in combination, a throttle valve movable to different positions to variably regulate the induction pressure, a servomotor for moving said throttle valve, operating connections between the servomotor and the throttle valve, a device for controlling the operation of said servomotor including coaxial and expansible pressure responsive elements for controlling the operation of said servomotor so that the throttle is moved upon changes in either atmospheric or induction pressure and means adjustable during operation of the engine for changing the adjustment of the operating connections between said servomotor and the throttle, so that the movement of the throttle effected by any given movement of said servomotor may be modified.

15. Apparatus for controlling the induction pressure of an aircraft engine having, in combination, a throttle valve movable to different positions to variably regulate the induction pressure, a hydraulic servomotor for moving said throttle valve, operating connections between the servomotor and the throttle valve, a control valve for regulating the action of said servomotor, pressure responsive elements operatively connected to said control valve and so constructed as to be responsive to changes in both atmospheric and induction pressure and effective to move said valve to cause operation of the servomotor upon such changes in pressure, operating connections between said servomotor and said throttle valve, and means adjustable during operation of the engine to modify the action of said operating connections whereby any given movement of the servomotor may effect different movements of the throttle valve as determined by the position of said adjustable means.

16. Apparatus for controlling the induction pressure of an aircraft engine having, in combination, a throttle valve movable to different positions to variably regulate the induction pressure, a hydraulic servomotor for moving said throttle valve, operating connections between the servomotor and the throttle valve, a control valve for regulating the action of said servomotor, pressure responsive elements operatively connected to said control valve and so constructed as to be responsive to changes in both atmospheric and induction pressure and effective to move said valve to cause operation of the servomotor upon such changes in pressure, operating connections between said servomotor and said throttle valve, and means adjustable during operation of the engine to modify the action of said operating connections whereby any given movement of the servomotor may effect different movements of the throttle valve as determined by the position of said adjustable means, said adjustable means being also effective to move said valve to cause operation of the servomotor independently of any change in atmospheric or induction pressure.

17. Apparatus for controlling the induction pressure of an aircraft engine having, in combination, a throttle valve movable to different positions to variably regulate the induction pressure, a hydraulic servomotor for moving said throttle valve, a control valve for regulating the action of said servomotor, operating connections between the servomotor and the throttle valve, pressure responsive elements operatively connected to said control valve and so constructed as to be responsive to changes in both atmospheric and induction pressure and effective to move said valve to cause operation of the servomotor upon such changes in pressure, operating connections between said servomotor and said throttle valve, a lever adjustable during operation of the engine to modify the effective action of said operating connections whereby any given movement of the servomotor may effect different movement of said throttle valve as determined by the position of said lever, said lever being also connected to said control valve so that adjustment of said lever will move said valve and cause operation of said servomotor independently of any change in either atmospheric or induction pressure.

18. Apparatus for controlling the induction pressure of an aircraft engine having, in combination, a throttle valve movable to different positions to variably regulate the induction pressure, means for moving the throttle valve to vary the induction pressure, a supercharger operable at variable speeds to also vary the induction pressure, a control device including pressure responsive elements for controlling the operation of said means for moving the throttle valve and operable in response to changes in both atmospheric and induction pressure, means for changing the supercharger speed, means for preventing operation of said last named means to increase the supercharger speed until said throttle has reached a predetermined open position, operating connections between the throttle operating means and the throttle, and means adjustable during operation of the engine for changing the adjustment of said operating connections so that movement of the throttle effected by any given movement of said operating means may be varied in accordance with the position of said adjustable means.

19. Apparatus for controlling the induction pressure of an aircraft engine having, in combination, a throttle valve movable to different positions to variably regulate the induction pressure, means for moving said throttle valve, operating connections between said means and the throttle, a device for controlling the operation of said means including coaxial and expansible pressure responsive elements for controlling the operation of said throttle moving means so that the throttle is moved upon changes in either atmospheric or induction pressure, means adjustable during operation of the engine for changing the adjustment of said operating connections, so that the movement of the throttle effected by any given movement of its operating means may be modified, a supercharger for supplying air under pressure to the engine intake, means for driving the supercharger from the engine, a change speed gearing for the supercharger, a member for changing the gear ratio of said change speed gearing and means controlled in response to altitude and the position of the throttle valve for operating said member.

20. A power plant for aircraft comprising an internal combustion engine having a fuel intake, a supercharger connected with the fuel intake, means for driving the supercharger by the engine including change speed gearing, a member for shifting the gearing and movable from a low-gear position to a high gear position, electrically operated means for moving the member, a throttle valve controlling the intake pressure produced by the supercharger, an automatic pressure regulator for maintaining a pressure in relation to altitude, an aneroid, means actuated by the aneroid and means actuated by the regulator for causing the electric servo-motor to move the change-speed member from low gear to high gear position when the throttle valve has been moved to a predetermined open position and at least a predetermined altitude has been reached.

21. A power plant for aircraft comprising an internal combustion engine having a fuel intake, a supercharger connected with the fuel intake, means for driving the supercharger by the engine including change speed gearing, a member for shifting the gearing and movable from a low-gear position to a high gear position, electrically operated means for moving the member, a throttle valve movable to control the intake pressure produced by the supercharger, an automatic pressure regulator for moving the throttle valve to maintain a pressure in relation to altitude, two switches in series for controlling the operation of the electric servo-motor, an aneroid operative to close one of the switches when a predetermined altitude has been reached, and means under the control of the regulator for closing the other of the switches when the throttle valve has reached a predetermined open position.

22. A power plant for aircraft comprising an internal combustion engine having a fuel intake, a supercharger connected with said fuel intake, means for driving the supercharger by the engine including a change speed gearing, a member for shifting the gearing from one of its positions to another, automatic electrically operated means for moving said member, a throttle valve movable to different positions to control the intake pressure, an automatic regulator for variably positioning the throttle to maintain a pressure in relation to altitude and circuit controlling means controlled in response to atmospheric pressure and the action of said regulator for causing said electrically operated means to effect movement of said gear shifting member when the throttle valve is moved to a predetermined position and a predetermined altitude is reached.

23. A power plant for aircraft comprising an internal combustion engine having a fuel intake, a supercharger connected with said fuel intake, means for driving the supercharger by the engine including a change speed gearing, a member for shifting the gearing from one of its positions to another, automatic electrically operated means for moving said member, a throttle valve movable to different positions to control the intake pressure, an automatic regulator for variably positioning the throttle in order to maintain a pressure in relation to altitude and circuit controlling means controlled in response to atmospheric pressure and by movement of the throttle valve to a predetermined open position by said pressure regulator to cause said automatic means to effect movement of said gear shifting member from low gear to high gear position when a predetermined altitude is reached.

24. A power plant for aircraft comprising an internal combustion engine having a fuel intake, a supercharger connected with said fuel intake, means for driving the supercharger by the engine including a change speed gearing, a member for shifting the gearing from one of its positions to another, automatic electrically operated means for moving said member, a throttle valve movable to different positions to control the intake pressure, an automatic regulator for variably positioning the throttle in order to maintain a pressure in relation to altitude and circuit controlling means controlled in response to atmospheric pressure and by action of said throttle valve regulator as the throttle is moved to wide open position, for causing said automatic means to effect movement of said gear shifting member from low gear to high gear position when a predetermined altitude is reached.

25. A power plant for aircraft comprising an internal combustion engine having a fuel mixture intake, a supercharger connected to said intake, means operable by the engine for driving said supercharger including a change speed gearing shiftable to low and high speed positions, electrically operated means for shifting said gearing from one position to another, a throttle valve movable to different positions to control the intake pressure, an automatic pressure regulator for variably positioning the throttle to maintain a pressure in relation to altitude, means for controlling the operation of said electrically operated means including a circuit controlling means operated in response to atmospheric pressure and closed when a predetermined altitude is reached and a second circuit controlling means operated by the pressure regulator.

26. A power plant for aircraft comprising an internal combustion engine having a fuel mixture intake, a supercharger connected to said intake, means operable by the engine for driving said supercharger including a change speed gearing shiftable to low and high speed positions, electrically operated means for shifting said gearing from one position to another, a throttle valve movable to different positions to control the intake pressure, an automatic pressure regulator for variably positioning the throttle to maintain a pressure in relation to altitude, means for controlling the operation of said electrically operated means including a circuit controlling means operated in response to atmospheric pressure and closed when a predetermined altitude is reached, a second circuit controlling means operated by the pressure regulator and closed thereby when the throttle is opened to a predetermined position.

27. A power plant for aircraft comprising an internal combustion engine having a fuel mixture intake, a supercharger connected to said intake, means operable by the engine for driving said supercharger including a change speed gearing shiftable to low and high speed positions, electrically operated means for shifting said gearing from one position to another, a throttle valve movable to different positions to control the intake pressure, an automatic pressure regulator for variably positioning the throttle to maintain a pressure in relation to altitude, means for controlling the operation of said electrically operated means including a circuit controlling means operated in response to atmospheric pressure and closed when a predetermined altitude is reached and a second circuit controlling means operated by movement of the throttle to a predetermined position.

28. A power plant for aircraft comprising an internal combustion engine having a fuel mixture intake, a supercharger connected to said intake, means operable by the engine for driving said supercharger including a change speed gearing shiftable to low and high speed positions, electrically operated means for shifting said gearing from one position to another, a throttle valve movable to different positions to control the intake pressure, an automatic pressure regulator for variably positioning the throttle to maintain a pressure in relation to altitude, means for controlling the operation of said electrically operated means including a circuit controlling means operated in response to atmospheric pressure and closed when a predetermined altitude is reached and a second circuit controlling means operated by movement of the throttle to substantially wide open position.

29. A power plant for aircraft comprising an internal combustion engine having a fuel mixture intake, a supercharger connected to said intake, means operable by the engine for driving said supercharger including a change speed gearing shiftable to low and high speed positions, electrically operated means for shifting said gearing from one position to another, a throttle valve movable to different positions to control the intake pressure, an automatic pressure regulator for variably positioning the throttle to maintain a pressure in relation to altitude, a control circuit for said electrically operated means, a switch for controlling said circuit operated in response to atmospheric pressure and closed when a predetermined altitude is reached, a second switch operated by the pressure regulator and closed when the throttle is moved to a predetermined position to cause said motor to move said gear shifting means to high speed and a manually operable switch for opening and closing said circuit.

30. A power plant for aircraft comprising an internal combustion engine having a fuel mixture intake, a supercharger connected to said intake, means operable by the engine for driving said supercharger including a change speed gearing shiftable to low and high speed positions, electrically operated means for shifting said gearing from one position to another, a throttle valve movable to different positions to control the intake pressure, an automatic pressure regulator for variably positioning the throttle to maintain a pressure in relation to altitude, a control circuit for said electrically operated means, a switch for controlling said circuit operated in response to atmospheric pressure and closed when a predetermined altitude is reached, a second switch operated by the pressure regulator and closed when the throttle is moved to a predetermined position to cause said motor to move said gear shifting means to high speed, a manually operated switch for opening and closing said circuit and means for moving said gear shifting means to its low speed position if said manually operable switch is opened when the gear shifting means is in high speed position.

CLARENCE H. JORGENSEN.
WILLIAM H. TAYLOR.

REFERENCES CITED

The following references are of record in the file of this patent:

UNITED STATES PATENTS

| Number | Name | Date |
|---|---|---|
| 2,134,742 | Stanton | Nov. 1, 1938 |
| 2,187,737 | Gregory | Jan. 23, 1940 |
| 2,217,364 | Halford et al. | Oct. 8, 1940 |
| 2,228,239 | Ammann | Jan. 14, 1941 |

FOREIGN PATENTS

| Number | Country | Date |
|---|---|---|
| 524,730 | Great Britain | of 1940 |